United States Patent
Lee et al.

(10) Patent No.: US 11,125,775 B1
(45) Date of Patent: Sep. 21, 2021

(54) PROBE AND MANUFACTURING METHOD OF PROBE FOR SCANNING PROBE MICROSCOPE

(71) Applicant: Kioxia Corporation, Tokyo (JP)

(72) Inventors: See Kei Lee, Kawasaki Kanagawa (JP); Mitsuo Koike, Yokohama Kanagawa (JP); Masumi Saitoh, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/008,803

(22) Filed: Sep. 1, 2020

(30) Foreign Application Priority Data

Mar. 4, 2020 (JP) .............................. JP2020-036941

(51) Int. Cl.
*G01Q 70/14* (2010.01)
*G01Q 60/58* (2010.01)
*G01Q 70/16* (2010.01)

(52) U.S. Cl.
CPC ............. *G01Q 70/14* (2013.01); *G01Q 60/58* (2013.01); *G01Q 70/16* (2013.01)

(58) Field of Classification Search
CPC ......... G01Q 70/14; G01Q 70/16; G01Q 60/58
USPC .......................... 850/40, 41, 56, 57, 59, 60
See application file for complete search history.

(56) References Cited

U.S. PATENT DOCUMENTS

| | | | |
|---|---|---|---|
| 7,514,678 | B2 | 4/2009 | Yao |
| 9,082,973 | B2 | 7/2015 | Ishikawa |
| 2012/0054924 | A1 | 3/2012 | Zhang |
| 2014/0284535 | A1 | 9/2014 | Saitoh |
| 2018/0074093 | A1* | 3/2018 | Harada .................. G01Q 60/40 |

* cited by examiner

*Primary Examiner* — Nicole M Ippolito
(74) *Attorney, Agent, or Firm* — Foley & Lardner LLP

(57) ABSTRACT

A manufacturing method of a probe according to the present embodiment is used to manufacture a probe for a scanning probe microscope. An insulating film is formed on the surface of a probe provided on a base. Metal ions are implanted into the insulating film. An electric field is applied to the insulating film to concentrate the metal ions in the insulating film at a tip of the probe and form a metallic filament in the insulating film.

13 Claims, 8 Drawing Sheets

PROBE AND MANUFACTURING METHOD OF PROBE FOR SCANNING PROBE MICROSCOPE

CROSS REFERENCE TO RELATED APPLICATIONS

This application is based upon and claims the benefit of priority from the prior Japanese Patent Application No. 2020-036941, filed on Mar. 4, 2020, the entire contents of which are incorporated herein by reference.

FIELD

The embodiments of the present invention relate to a probe and manufacturing method of a probe for a scanning probe microscope.

BACKGROUND

A scanning probe microscope (SPM) includes a cantilever having a probe on an end. Particularly, a scanning thermal microscope (SThM) can measure a surface temperature of a specimen by measuring a current generated due to the Seebeck effect using a probe including a thermocouple on a tip, or can examine thermal conductivity characteristics of the specimen surface on the basis of temperature dependency of an electrical resistance of a probe tip portion. In order to apply the thermal microscope to a nanometer-scale level microscopic structure, a conductive probe downscaled to the nanometer-scale level is required.

For example, a thermocouple probe formed by joining different types of metals is used as the probe of the cantilever. The spatial resolution of this cantilever depends on the size of metal joint point. Therefore, sufficient reduction in the size of the probe tip is required to enable thermal characterization of a nanometer-scale level microscopic structure.

DETAILED DESCRIPTION

Figure 1:
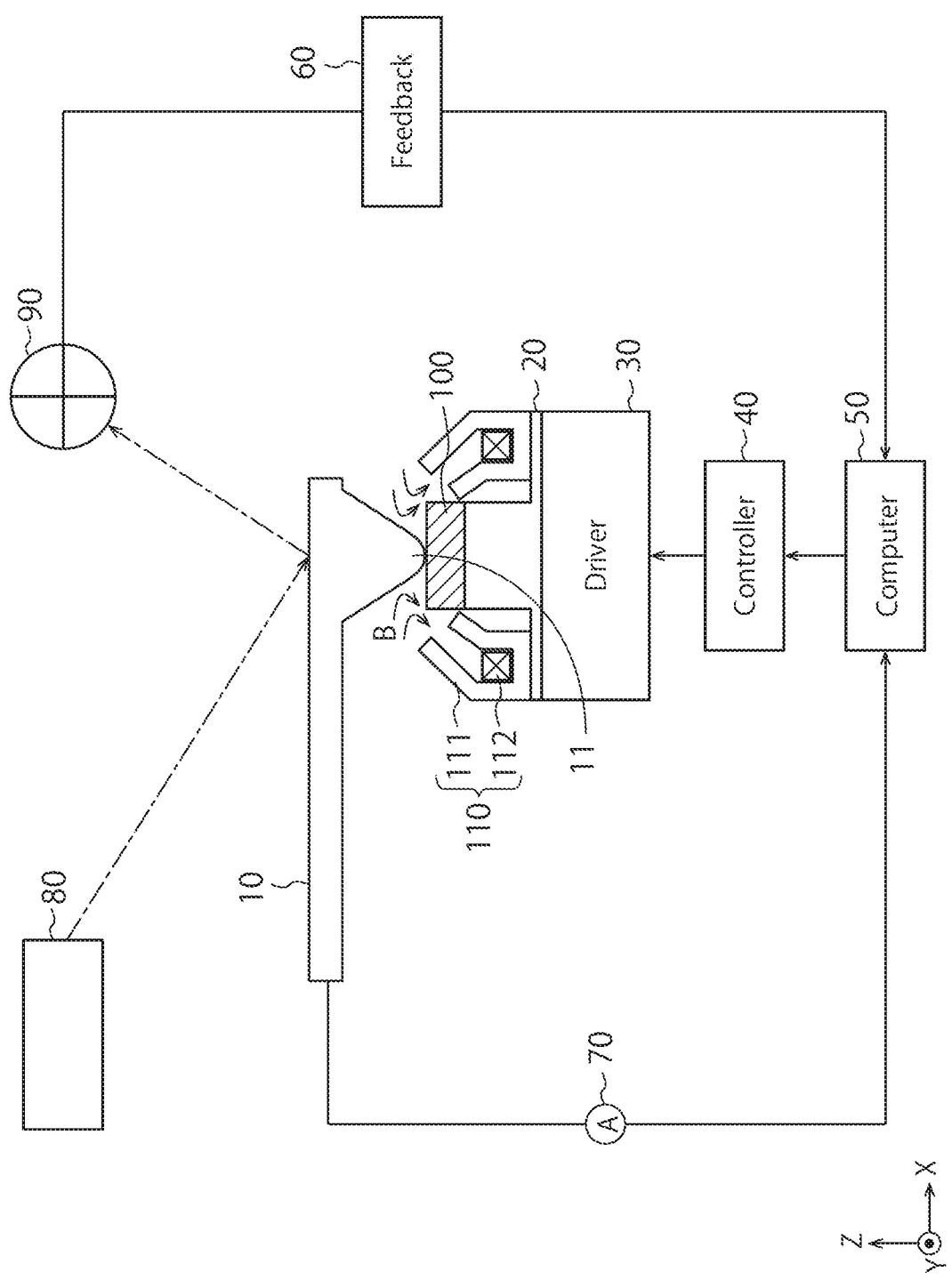
FIG. 1 is a block diagram illustrating an example of a configuration of a scanning probe microscope according to a first embodiment.

Embodiments will now be explained with reference to the accompanying drawings. The present invention is not limited to the embodiments. In the present specification and the drawings, elements identical to those described in the foregoing drawings are denoted by like reference characters and detailed explanations thereof are omitted as appropriate.

A manufacturing method of a probe according to the present embodiment is used for manufacturing a probe for a scanning microscope. An insulating film is formed on the surface of a probe provided on a base. Metal ions are implanted into the insulating film. An electric field is applied to the insulating film to concentrate the metal ions in the insulating film of the probe to form a metallic filament in the insulating film.

First Embodiment

FIG. 1 is a block diagram illustrating an example of a configuration of a scanning probe microscope according to a first embodiment. The scanning probe microscope (hereinafter, also SPM) 1 includes a cantilever 10, a stage 20, a driver 30, a controller 40, a computer 50, a feedback circuit 60, an ammeter 70, a light emitting element 80, a photodetector 90, and a magnetic field generation device 110.

The SPM 1 scans the surface of a specimen 100 on the stage 20 using a tip of a conductive probe 11 of the cantilever 10. At this time, a voltage is applied between the cantilever 10 and the specimen 100, whereby the SPM 1 evaluates the electrical characteristics of the specimen 100 on the basis of a current flowing through the probe 11. The SPM 1 may be configured as a scanning thermal microscope (SThM). In this case, the SPM 1 measures the temperature or the thermal characteristics of the specimen 100.

The cantilever 10 has the probe 11 on an end of a cantilever base and is brought into contact with the surface of the specimen 100 at the tip of the probe 11 to scan the specimen 100. A configuration of the cantilever 10 and a manufacturing method thereof will be explained later.

The stage 20 is configured to enable the specimen 100 to be mounted thereon. The stage 20 is formed of, for example, a conductive material such as metal and functions as an electrode at the time of measurement of the electrical characteristics or the thermal characteristics of the specimen 100.

The driver 30 can move the stage 20. For example, the driver 30 is a scanner that incorporates a piezoelectric element for driving three axes including an X axis, a Y axis, and a Z axis, and can move the stage 20 in the Z direction to bring the specimen 100 closer to the probe 11 or to separate the specimen 100 from the probe 11 and also move the specimen 100 in an X-Y plane.

The controller 40 controls the driver 30 to control the position of the stage 20. The computer 50 receives a detection result from the photodetector 90 via the feedback circuit 60 and calculates the position of the probe 11. The computer 50 outputs a location command, a speed command, a torque command, and the like (etc.) to the controller 40 to move the stage 20 to a predetermined position on the basis of the position of the probe 11.

The ammeter 70 is connected to the cantilever 10 and measures a current flowing through the probe 11 and transmit a measurement result to the computer 50. The computer 50 stores therein the measurement result and calculates the electrical characteristics or the thermal characteristics of the specimen 100 on the basis of the measurement result. The computer 50 also generates a topography and a temperature or thermal characteristic distribution image of the specimen 100.

The light emitting element 80 irradiates the back surface of the cantilever 10 with light (for example, laser light). The photodetector 90 detects the reflection light having reflected from the back surface of the cantilever 10. Accordingly, the angle of the cantilever 10 can be detected.

The feedback circuit 60 feeds back a signal from the photodetector 90 to the computer 50. The computer 50 adjusts the height of the specimen 100 on the stage 20 via the controller 40 and the driver 30. This enables the SPM 1 to control the distance between the cantilever 10 and the specimen 100 or the contact state (pressing force, or the like (etc.)) therebetween.

The magnetic field generation device 110 may be, for example, an electromagnetic lens including a pole piece 111 and an electromagnetic coil 112. The pole piece 111 and the electromagnetic coil 112 are established around the stage 20 and concentratedly apply a magnetic field B to the probe 11. When the stage 20 is substantially circular as viewed in the Z direction, the magnetic field generation device 110 may be formed in an annular shape to conform to the shape of the stage 20. The magnetic field generation device 110 is attached to the stage 20. The magnetic field generation device 110 is not necessarily mounted on the stage 20. The magnetic field generation device 110 may apply a magnetic field to the probe 11.

Next, a configuration of the cantilever 10 is explained. The cantilever 10 scans the surface of the specimen 100 while being in contact with the specimen 100 at the tip of the probe 11 and evaluates the electrical characteristics or the thermal characteristics of the specimen 100.

Figure 2:
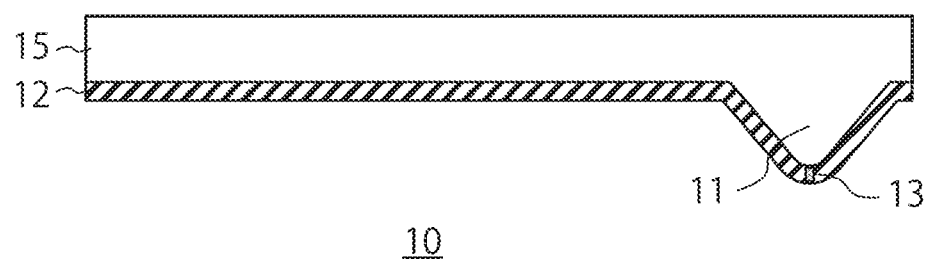
FIG. 2 is a cross-sectional view illustrating an example of a configuration of a probe according to the first embodiment.

FIG. 2 is a cross-sectional view illustrating an example of the configuration of the cantilever according to the first embodiment. The cantilever 10 includes a base 15, a probe 11, an insulating film 12, and a metallic filament 13. The base 15 is, for example, a prismatic beam supported at one side and has the probe 11 on a distal end. The probe 11 protrudes in a substantially perpendicular direction to the extending direction of the base 15. The base 15 and the probe 11 may be formed as one unit. In the present embodiment, a conductive material such as metal is used as the base 15 and the probe 11. Alternatively, silicon may be used as the base 15 and the probe 11.

The insulating film 12 coats the surface of the base 15 and also coats the surface of the probe 11. For example, an insulating material such as a silicon dioxide film, a silicon nitride film, an aluminum oxide, or an aluminum nitride is used as the insulating film 12. The insulating film 12 contains metal ions.

The filament 13 is formed by the concentration of metal ions in the insulating film 12 between the tip of the probe 11 and the specimen 100. The metallic filament 13 is formed from the same metal as that of the metal ions contained in the insulating film 12. That is, the insulating film 12 coating the probe 11 contains the same type of metal ions as that of the metallic filament 13.

Figure 3:
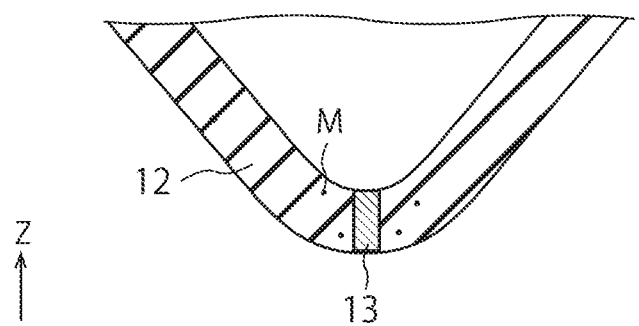
FIG. 3 is an enlarged cross-sectional view illustrating a tip of a probe of a cantilever.

FIG. 3 is an enlarged cross-sectional view illustrating the tip of the probe. The probe 11 is coated with the insulating film 12 and the metallic filament 13 is provided on the tip of the probe 11. The filament 13 is formed by the concentration of metal ions in the insulating film 12 between the tip of the probe 11 and the specimen 100. Accordingly, when the probe 11 scans the specimen 100, the metallic filament 13 is brought into direct contact with the specimen 100 at the tip of the probe 11, thereby electrically connecting the probe 11 (that is, the base 15) and the specimen 100 located outside the insulating film 12. The insulating film 12 covers the periphery of the metallic filament 13 and electrically insulates the probe 11 from outside.

The metallic filament 13 is formed of metal M similar as that of the metal ions contained in the insulating film 12. For example, any metal selected from a group consisting of gold (Au), platinum (Pt), zirconium (Zr), iridium (Ir), tellurium (Te), bismuth (Bi), vanadium (V), tin (Sn), indium (In), palladium (Pd), and rhodium (Rh), an alloy of any two or more types of metal selected from the group, a nitride of any metal selected from the group, a carbide of any metal selected from the group, or a chalcogenide material of any metal selected from the group is used as the metallic filament 13.

As described above, the cantilever 10 according to the present embodiment has the surface of the probe 11 of the base 15 coated with the insulating film 12 and electrically connects between the base 15 and the specimen 100 only with the metallic filament 13. The insulating film 12 that covers the periphery of the metallic filament 13 electrically insulates the probe 11 or the base 15 from the specimen 100.

Next, a manufacturing method of the cantilever 10 is explained.

Figure 4:
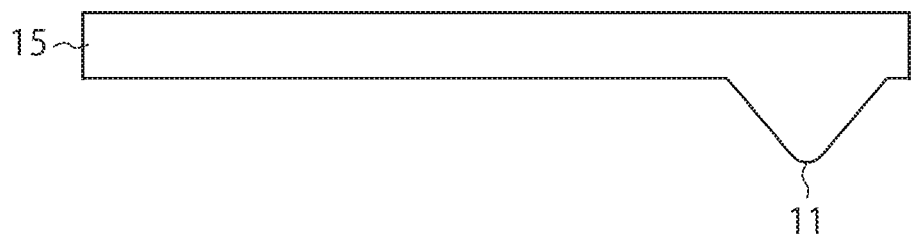
FIG. 4 is a schematic diagram illustrating an example of a manufacturing method of a probe according to the first embodiment.

FIGS. 4 to 8B are schematic diagrams illustrating an example of the manufacturing method of a cantilever according to the first embodiment. First, the base 15 is prepared as illustrated in FIG. 4. The base 15 is, for example, a base of a prismatic beam supported at one side and has the probe 11 on one end. The probe 11 protrudes in a substantially perpendicular direction to the extending direction of the base 15. The base 15 and the probe 11 are configured as one unit. In the present embodiment, a conductive material such as metal is used as the base 15 and the probe 11. Silicon may be used as the base 15 and the probe 11.

Figure 5:
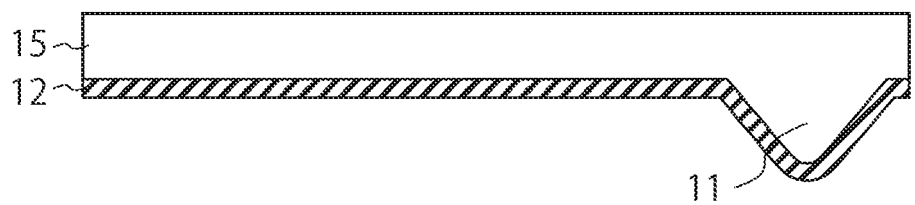
FIG. 5 is a schematic diagram illustrating an example of the manufacturing method of a probe subsequent to the method in FIG. 4.

Next, the insulating film 12 is formed on the surface of the base 15 where the probe 11 is located, as illustrated in FIG. 5. The insulating film 12 coats the surface of the probe 11. For example, an insulating material such as a silicon dioxide film, a silicon nitride film, an aluminum oxide, or an aluminum nitride is used as the insulating film 12. The thickness of the insulating film 12 is, for example, less than 100 nanometers.

Figure 6A:
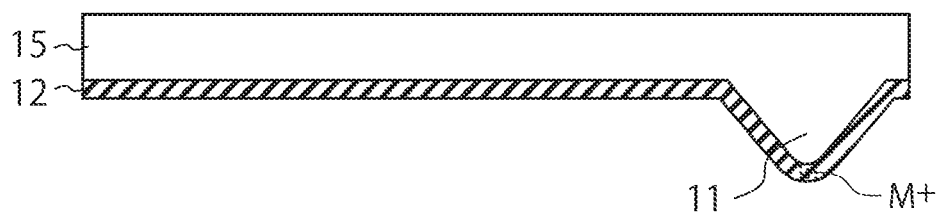
FIG. 6A is a schematic diagram illustrating an example of the manufacturing method of a probe subsequent to the method in FIG. 5.
Figure 6B:
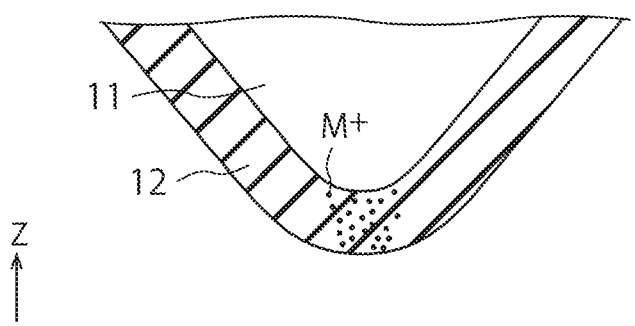
FIG. 6B is an enlarged cross-sectional view of a tip portion of the probe illustrated in FIG. 6A.

Next, metal ions $M^+$ are introduced into the insulating film 12 coating the probe 11 as illustrated in FIGS. 6A and 6B. FIG. 6B is an enlarged cross-sectional view of a tip portion of the probe 11 illustrated in FIG. 6A. The metal ions $M^+$ may be introduced, for example, by any of the ion implantation method, a plasma-immersion implantation method, plasma ion processing, and the like (etc.). At this time, the metal ions $M^+$ are implanted from below the probe 11 in the opposite direction to the protruding direction (the Z direction). That is, the metal ions $M^+$ are implanted in a direction opposing the probe 11. In this case, the tip of the probe 11 is at a risk of being rounded due to the ion implantation. The metal ions $M^+$ may be implanted from the back surface side of the base 15 on the opposite side to the probe 11. That is, the metal ions $M^+$ may penetrate the base 15 in the opposite direction (the −Z direction) to the protruding direction to be implanted into the insulating film 12. In this case, the tip of the probe 11 is not scraped and is not rounded because the metal ions $M^+$ are introduced from the back surface of the base 15.

Figure 7A:
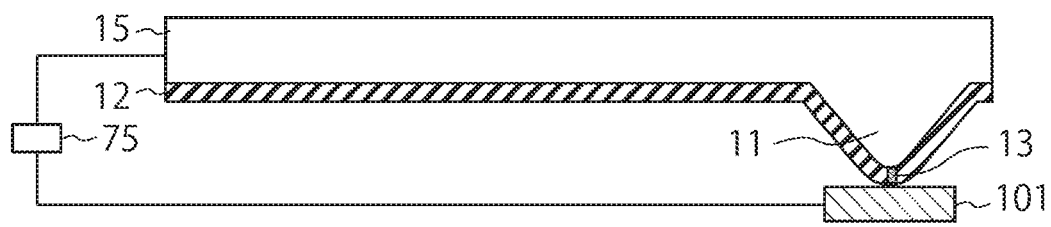
FIG. 7A is a schematic diagram illustrating an example of the manufacturing method of a probe subsequent to the method in FIG. 6A.
Figure 7B:
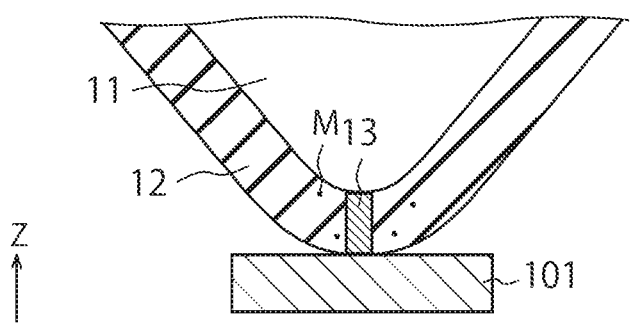
FIG. 7B is an enlarged cross-sectional view of a tip portion of the probe illustrated in FIG. 7A.

Next, the insulating film 12 on the tip of the probe 11 is brought into contact with an electrode 101 as illustrated in FIGS. 7A and 7B. FIG. 7B is an enlarged cross-sectional view of the tip portion of the probe 11 illustrated in FIG. 7A. The electrode 101 may be a conductive body mounted on the stage 20 instead of the specimen 100.

Subsequently, an electric field is applied to the insulating film 12, thereby concentrating the metal ions $M^+$ in the insulating film 12 at the tip of the probe 11 and forming the metallic filament 13 in the insulating film 12. At this time, a power source 75 is connected between the electrode 101 and the base 15 and a voltage between the electrode 101 and the base 15 is applied. The electrode 101 is a conductive body that is used to form the metallic filament 13 being a conductive body, and is different from the specimen 100 being a measurement target. The electrode 101 is brought into contact with the bottom surface of the insulating film 12 at the tip of the probe 11. A voltage is then applied between the probe 11 and the electrode 101. Accordingly, an electric field is generated in the insulating film 12. The electric field is strongest at the tip of the probe 11, and the metal ions $M^+$ are accumulated in the insulating film 12 between the tip of the probe 11 and the electrode 101 by inverting the polarity of the applied voltage at least two or more times. Thereafter, the metal ions $M^+$ combine with electrons supplied from the electrode 101 to become the metal M and form a stable metallic filament 13. That is, the metal ions $M^+$ move to the insulating film 12 between the tip of the probe 11 and the electrode 101 and are concentrated therein, and thereafter become the metal M to be the metallic filament 13 in a stable state. Accordingly, the metallic filament 13 is formed so as to penetrate through the insulating film 12 in the thickness direction of the insulating film 12 at the tip of the probe 11. When the metallic filament 13 is formed of, for example, stable metal (noble metal) M such as gold or platinum, the metallic filament 13 is unlikely to be oxidized and is unlikely to move. In this case, the metallic filament 13 is relatively less likely to be deteriorated (oxidized) at a subsequent time of measurement of the electrical characteristics or the thermal characteristics of the specimen 100.

In the formation process of the metallic filament 13, the power source 75 inverts the polarity of the voltage applied to the electrode 101 and the base 15 in some cases. Therefore, the power source 75 is specified to be capable of inverting the polarity. The power source 75 applies an electric field to the insulating film 12 while inverting the polarity between the +Z direction and the −Z direction. The insulating film 12 may be broken if inversion of the application direction of the electric field is excessively repeated. Therefore, it is preferable to limit the number of times of inversion of the polarity by the power source 75.

Figure 8A:
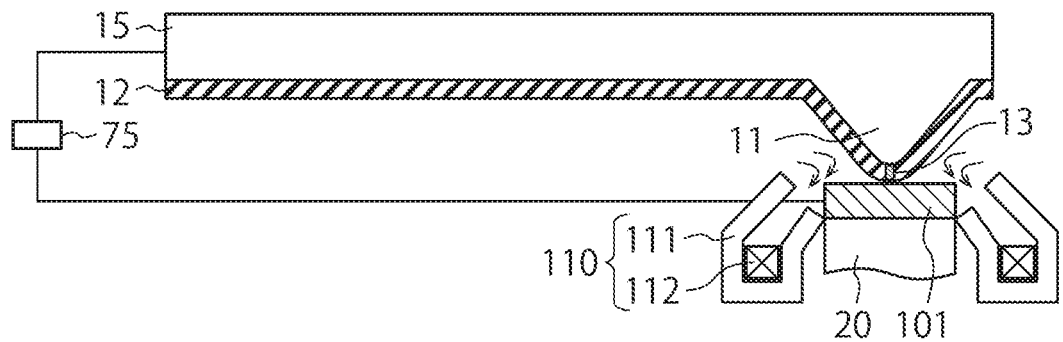
FIG. 8A is a diagram illustrating a manner in which a magnetic field is applied to an insulating film.
Figure 8B:
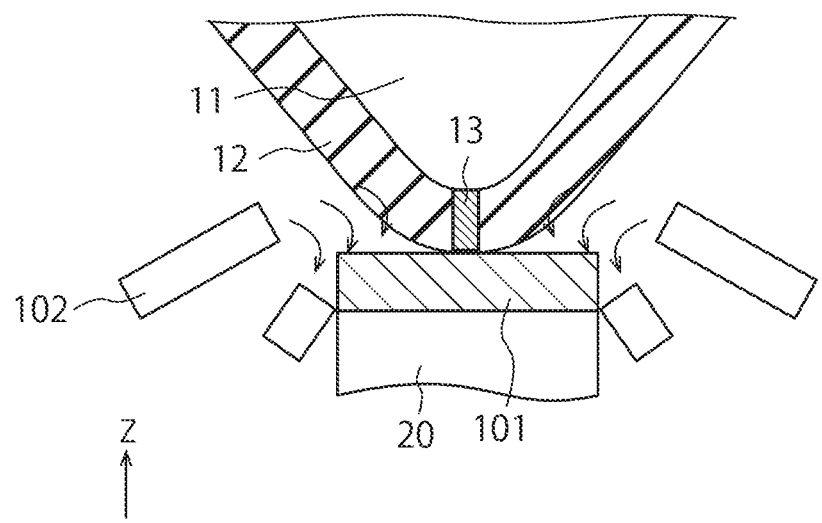
FIG. 8B is a diagram illustrating a manner in which a magnetic field is applied to an insulating film.

In the present embodiment, at the same time as application of the electric field to the insulating film 12, the magnetic field B is applied to the insulating film 12 as illustrated in FIGS. 8A and 8B. FIGS. 8A and 8B are views illustrating a manner in which the magnetic field B is applied to the insulating film 12. The magnetic field generation device 110 passes a current through the electromagnetic coil 112 provided around the stage 20 to generate the magnetic field B. The pole piece 111 induces the magnetic field B and applies the large magnetic field B to the insulating film 12 at the tip of the probe 11. Accordingly, the magnetic field B as well as the electric field is applied to the metal ions $M^+$ at the tip of the probe 11. The magnetic field B is applied in the vertical direction to the center of the probe 11. As a result, the metal ions $M^+$ are more effectively concentrated in the insulating film 12 between the tip of the probe 11 and the electrode 101 and combine with electrons to become the metal M and form the stable metallic filament 13. The width (diameter) of the metallic filament 13 exposed on the surface of the insulating film 12 is, for example, less than 5 nanometers. Accordingly, the spatial resolution in the thermal characterization of the probe 11 of the SPM 1 is less than 5 nanometers.

In some cases, at the time of mounting the specimen 100 on the stage 20 and measuring the electrical characteristics or the thermal characteristics, the measurement is performed while a voltage is applied between the probe 11 and the specimen 100. Meanwhile, the magnetic field is not required after formation of the metallic filament 13. Therefore, at the time of measuring the thermal characteristics of the specimen 100, the magnetic field generation device 110 is not required and may be detached from the SPM 1.

The electrical characteristics or the thermal characteristics of the specimen 100 can be measured based on temperature changes of the electric characteristics (for example, a resistance value) of the metallic filament 13.

As described above, according to the present embodiment, the metal ions $M^+$ are concentrated (accumulated) in the insulating film 12 at the tip of the probe 11 by introducing the metal ions $M^+$ into the insulating film 12 of the probe 11 of the base 15 and applying an electric field or an electric field and a magnetic field thereto. Accordingly, the filament 13 is formed by the concentration of metal ions in the insulating film 12 between the tip of the probe 11 and the specimen 100.

The metallic filament 13 is formed considerably thinly at the tip of the probe 11 and has a high spatial resolution. When metallic filament 13 is formed of, for example, stable metal such as gold or platinum, the metallic filament 13 is stable and is relatively less likely to deteriorate at the time of measurement of the electrical characteristics or the thermal characteristics of the specimen 100.

(Modification)

At the time of forming the metallic filament 13, the voltage of the power source 75 may be gradually increased and the electric field applied to the insulating film 12 may be gradually enhanced. This also enables the metallic filament 13 to be formed to be gradually concentrated in the tip of the probe 11.

Second Embodiment

Figure 9A:
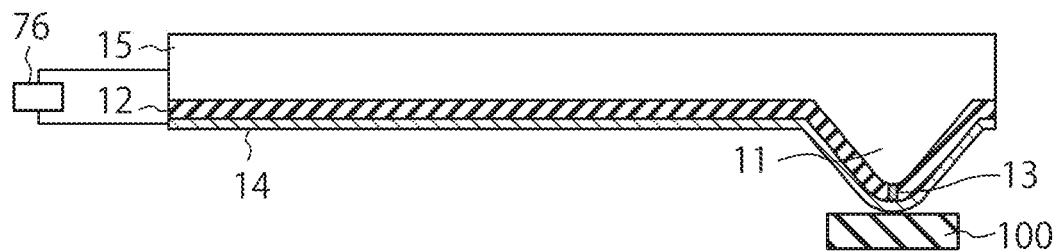
FIG. 9A is a cross-sectional view illustrating an example of a configuration of a filament and a formation process according to a second embodiment.
Figure 9B:
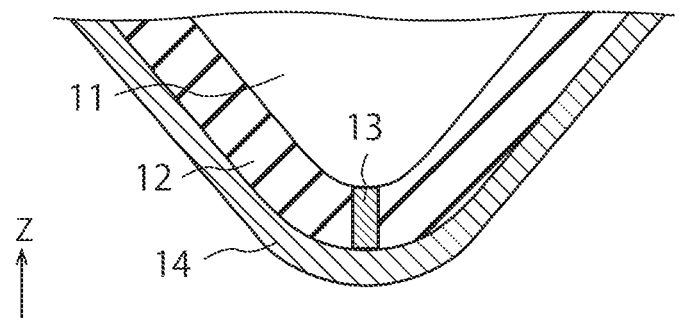
FIG. 9B is an enlarged cross-sectional view of a tip portion of a probe illustrated in FIG. 9A.

FIG. 9A is a cross-sectional view illustrating an example of a configuration of a filament and a measuring method according to a second embodiment. FIG. 9B is an enlarged cross-sectional view of a tip portion of the probe 11 illustrated in FIG. 9A.

In the second embodiment, a conductor film 14 coats the insulating film 12 at the tip of the probe 11. The conductor film 14 is used as a measuring electrode at the time of measuring the thermal characteristics of the specimen 100 in a case in which the specimen 100 is insulative. The conductor film 14 may entirely coat the insulating film 12 or may coat only the surface of the probe 11. The conductor film 14 may be formed on the insulating film 12 after the metallic filament 13 is formed. A forming method of the metallic filament 13 is identical to that in the first embodiment. Therefore, FIGS. 9A and 9B illustrate a manner at the time of measuring the thermal characteristics of the specimen 100.

In a case in which the specimen 100 on the stage 20 is an insulator, the conductor film 14 needs to be thus provided as a measuring electrode on the side of the cantilever 10. Metal having a high thermal conductivity, such as gold, silver, copper, aluminum, or tungsten may be used as the conductor film 14. Other substances such as diamond and diamond-like carbon may be used.

A power source 76 applies power between the conductor film 14 and the probe 11 at the time of measuring the thermal characteristics of the specimen 100. The power source 76 may be a power source different from the power source 75 used to form the metallic filament 13 or may be the same power source.

The conductor film 14 may be formed on the insulating film 12 after the metallic filament 13 is formed at the tip of the probe 11 as illustrated in FIG. 7A.

Other configurations and manufacturing processes according to the second embodiment may be identical to corresponding configurations and manufacturing processes according to the first embodiment. Accordingly, the second embodiment can attain identical effects as those of the first embodiment.

Third Embodiment

Figure 10A:
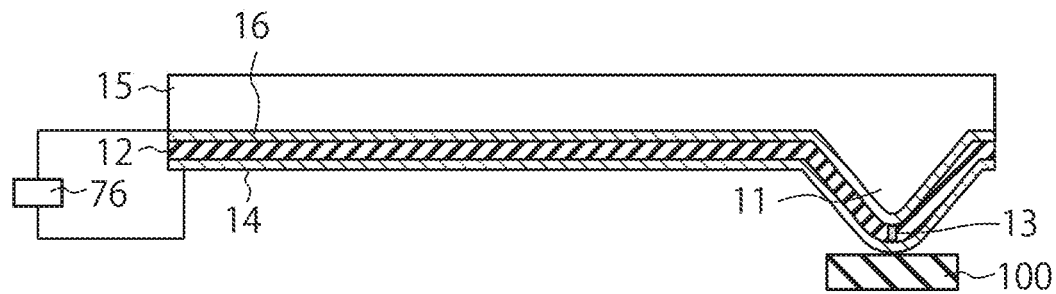
FIG. 10A is a cross-sectional view illustrating an example of a configuration of a filament and a formation process according to a third embodiment.
Figure 10B:
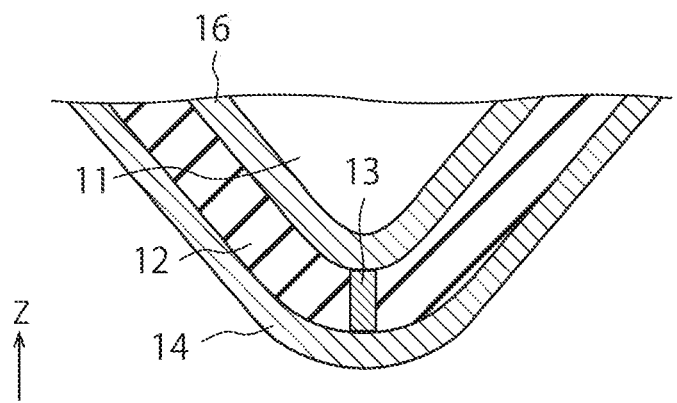
FIG. 10B is an enlarged cross-sectional view of a tip portion of a probe illustrated in FIG. 10A.

FIG. 10A is a cross-sectional view illustrating an example of a configuration of a filament and a measuring method according to a third embodiment. FIG. 10B is an enlarged cross-sectional view of a tip portion of the probe 11 illustrated in FIG. 10A.

In the third embodiment, the base 15 is a non-conductive body. Therefore, a conductor film 16 is formed on the surface of the probe 11 of the base 15. The conductor film 16 entirely coats one surface of the base 15, on which the probe 11 is provided.

The insulating film 12 coats the conductor film 16. The insulating film 12 may spread out of the conductor film 16 to be in contact with the base 15. However, because the conductor film 16 needs to be electrically connected to the power source 75 for formation of the metallic filament 13 and the power source 75 or 76 for measurement of the thermal characteristics, at least a part of the conductor film 16 needs to be exposed from the insulating film 12.

The conductor film 16 replaces the base 15 in functioning as an electrode at the time of forming the metallic filament 13. Therefore, the conductor film 16 is formed on the bottom surface of the base 15 in the formation process of the metallic filament 13. The power source 75 illustrated in FIG. 7A is connected between the conductor film 16 and the electrode 101. The power source 75 applies a voltage between the conductor film 16 and the electrode 101, whereby the metallic filament 13 is formed in the insulating film 12. The forming method of the metallic filament 13 is basically the same as that in the first embodiment. The conductor film 16 may also be used as a measuring electrode at the time of measuring the thermal characteristics of the specimen 100. That is, the conductor film 16 is an electrode for forming the metallic filament 13 and is also an electrode for measuring the characteristics of the specimen 100.

The conductor film 14 is used as a measuring electrode similarly to that in the second embodiment at the time of measuring the thermal characteristics of the specimen 100 in a case in which the specimen 100 is insulative. The conductor film 14 is electrically insulated from the conductor film 16 by the insulating film 12. The conductor film 14 may entirely coat the insulating film 12 or may coat only the insulating film 12 on the surface of the probe 11. The conductor film 14 may be formed on the insulating film 12 after the metallic filament 13 is formed.

In a case in which the specimen 100 on the stage 20 is an insulator and the base 15 is non-conductive, the conductor films 14 and 16 need to be thus provided as bipolar electrodes. The conductor film 14 functions as a measuring electrode for measuring the thermal characteristics of the specimen 100. The conductor film 16 functions as both an electrode for forming the metallic filament 13 and an electrode for measuring the characteristics of the specimen 100.

For example, gold, silver, copper, aluminum, tungsten, and other substances such as diamond and diamond-like carbon can be used as the conductor film 14. For example, any metal selected from a group consisting of gold (Au), platinum (Pt), zirconium (Zr), iridium (Ir), tellurium (Te), bismuth (Bi), vanadium (V), tin (Sn), indium (In), palladium (Pd), and rhodium (Rh), an alloy of any two or more types of metal selected from the group, a nitride of any metal selected from the group, a carbide of any metal selected from the group, or a chalcogenide material of any metal selected from the group is used as the conductor film 16.

The conductor film 16 may be formed on the surface of the probe 11 of the base 15. After the conductor film 16 is formed on the surface of the probe 11 of the base 15, the insulating film 12, the conductor film 14, and the metallic filament 13 may be formed in a similar manner to those in the second embodiment.

Other configurations and manufacturing processes according to the third embodiment may be identical to corresponding configurations and manufacturing processes according to the first or second embodiment. Accordingly, the third embodiment can attain identical effects as those of the first or second embodiment.

Fourth Embodiment

Figure 11A:
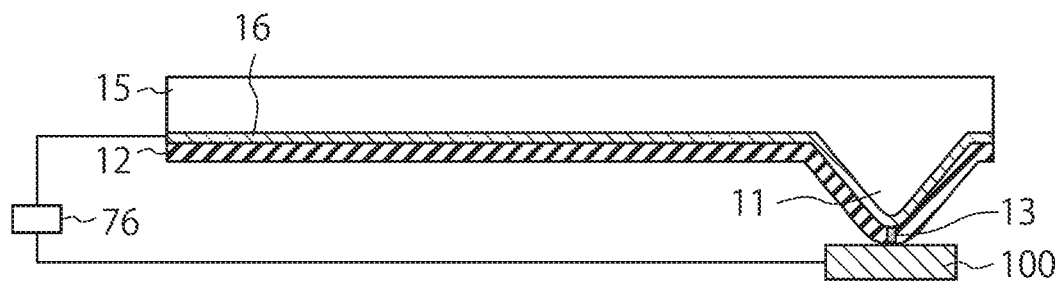
FIG. 11A is a cross-sectional view illustrating an example of a configuration of a filament and a formation process according to a fourth embodiment.
Figure 11B:
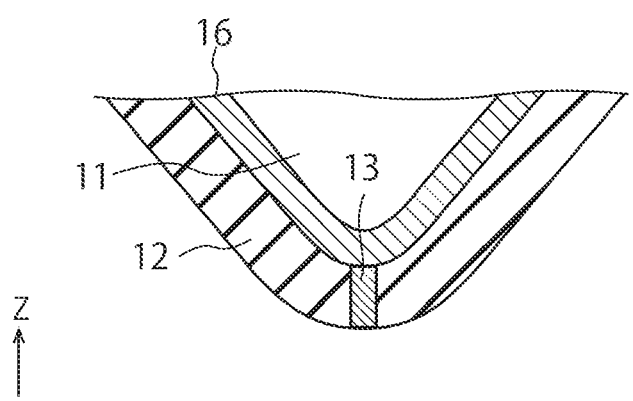
FIG. 11B is an enlarged cross-sectional view of a tip portion of a probe illustrated in FIG. 11A.

FIG. 11A is a cross-sectional view illustrating an example of a configuration of a filament and a measuring method according to a fourth embodiment. FIG. 11B is an enlarged cross-sectional view of a tip portion of the probe 11 illustrated in FIG. 11A.

In the fourth embodiment, the base 15 is a non-conductive body. Therefore, the conductor film 16 is formed on the surface of the probe 11 of the base 15 similarly to the third embodiment. Meanwhile, the conductor film 14 is not required in a case in which the specimen 100 on the stage 20 is a conductive body. Therefore, the conductor film 14 is not provided in the fourth embodiment.

The insulating film 12 is coated on the conductor film 16. The insulating film 12 may spread out of the conductor film 16 to be in contact with the base 15. However, because the conductor film 16 needs to be electrically connected to the power source 75 illustrated in FIG. 7A or the power source 76 illustrated in FIG. 11A, at least a part of the conductor film 16 needs to be exposed from the insulating film 12. The conductor film 16 functions as both an electrode for forming the metallic filament 13 and an electrode for measuring the electrical characteristics and the thermal characteristics of the specimen 100 similarly to that in the third embodiment.

In a case in which the electrode 101 being a conductive body is mounted on the stage 20 and the base 15 is non-conductive, the conductor film 16 needs to be provided in this manner as an electrode.

The conductor film 16 may be formed on the surface of the probe 11 of the base 15 as illustrated in FIG. 4. After the conductor film 16 is formed on the surface of the probe 11 of the base 15, the insulating film 12 and the metallic filament 13 may be formed in a similar manner to those in the first embodiment.

To form the metallic filament 13, the electrode 101 illustrated in FIG. 7B is provided in addition to the conductor film 16, and the power source 75 is connected between the electrode 101 and the conductor film 16. Using the electrode 101 and the conductor film 16 as the electrodes, the power source 75 applies an electric field to the insulating film 12 between the electrode 101 and the conductor film 16 at the tip of the probe 11. Further, the magnetic field generation device 110 illustrated in FIGS. 8A and 8B may be provided in the fourth embodiment to apply a magnetic field as well as an electric field to the insulating film 12. This enables an electric field or an electric field and a magnetic field to be applied to the metal ions $M^+$ of the insulating film 12 on the probe 11. As a result, the filament 13 is formed by the concentration of metal ions in the insulating film 12 between the tip of the probe 11 and the specimen 100 as illustrated in FIG. 9B.

Other configurations and manufacturing processes according to the fourth embodiment may be identical to corresponding configurations and manufacturing processes according to the first or third embodiment. Accordingly, the fourth embodiment can attain identical effects as those of the first or third embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A manufacturing method of a probe used for a scanning probe measuring apparatus, the method comprising:
   forming an insulating film on a surface of a probe provided on a base;
   implanting metal ions into the insulating film; and
   applying an electric field to the insulating film to concentrate the metal ions in the insulating film at a tip of the probe and form a metallic filament in the insulating film.

2. The method of claim 1, comprising applying a magnetic field as well as an electric field to the insulating field at the time of formation of the metallic filament.

3. The method of claim 2, wherein any metal selected from a group consisting of gold (Au), platinum (Pt), zirconium (Zr), iridium (Ir), tellurium (Te), bismuth (Bi), vanadium (V), tin (Sn), indium (In), palladium (Pd), and rhodium (Rh), an alloy of any two or more types of metal selected from the group, a nitride of any metal selected from the group, a carbide of any metal selected from the group, or a chalcogenide material of any metal selected from the group is used as the metallic filament.

4. The method of claim 2, wherein
   the base is a conductive body, and
   an electric field is applied to the insulating film by bringing an electrode into contact with a bottom surface of the base and applying a voltage between the base and the electrode at a time of formation of the metallic filament.

5. The method of claim 2, wherein
   the base is a non-conductive body,
   a first conductor film is formed on a surface of a probe provided on the base,
   the insulating film is formed on the first conductor film, and
   an electric field is applied to the insulating film by bringing an electrode into contact with a bottom surface of the insulating film and applying a voltage between the first conductor film and the electrode at a time of formation of the metallic filament.

6. The method of claim 2, wherein a direction of an electric field and a direction of a magnetic field are substantially same directions, where the electric field and the magnetic field are applied to the insulating film.

7. The method of claim 2, wherein
   an application direction of an electric field applied to the insulating film is changed between a protruding direction of the probe and an opposite direction to the protruding direction, and
   an application direction of a magnetic field applied to the insulating film is not changed.

8. The method of claim 1, wherein any metal selected from a group consisting of gold (Au), platinum (Pt), zirconium (Zr), iridium (Ir), tellurium (Te), bismuth (Bi), vanadium (V), tin (Sn), indium (In), palladium (Pd), and rhodium (Rh), an alloy of any two or more types of metal selected from the group, a nitride of any metal selected from the group, a carbide of any metal selected from the group, or a chalcogenide material of any metal selected from the group is used as the metallic filament.

9. The method of claim 8, wherein
   the base is a conductive body,
   an electric field is applied to the insulating film by bringing an electrode into contact with a bottom surface of the base and applying a voltage between the base and the electrode at a time of formation of the metallic filament.

10. The method of claim 8, wherein
    the base is a non-conductive body,
    a first conductor film is formed on a surface of a probe provided on the base,
    the insulating film is formed on the first conductor film, and
    an electric field is applied to the insulating film by bringing an electrode into contact with a bottom surface of the insulating film and applying a voltage between the first conductor film and the electrode at a time of formation of the metallic filament.

11. The method of claim 1, wherein
    the base is a conductive body, and
    an electric field is applied to the insulating film by bringing an electrode into contact with a bottom surface of the base and applying a voltage between the base and the electrode at a time of formation of the metallic filament.

12. The method of claim 1, wherein
the base is a non-conductive body,
a first conductor film is formed on a surface of a probe provided on the base,
the insulating film is formed on the first conductor film, and
an electric field is applied to the insulating film by bringing an electrode into contact with a bottom surface of the insulating film and applying a voltage between the first conductor film and the electrode at a time of formation of the metallic filament.

13. The method of claim 1, wherein the metal ions are implanted in a protruding direction of the probe or an opposite direction to the protruding direction.

\* \* \* \* \*